United States Patent
Kelly et al.

(10) Patent No.: US 10,477,152 B2
(45) Date of Patent: Nov. 12, 2019

(54) MEDIA DEVICE AND INTERFACE

(75) Inventors: David Kelly, Isleworth (GB); Nicholas James, Isleworth (GB)

(73) Assignee: SKY CP LIMITED (GB)

( * ) Notice: Subject to any disclaimer, the term of this patent is extended or adjusted under 35 U.S.C. 154(b) by 442 days.

(21) Appl. No.: 12/520,428

(22) PCT Filed: Dec. 21, 2007

(86) PCT No.: PCT/GB2007/004945
§ 371 (c)(1),
(2), (4) Date: Dec. 13, 2009

(87) PCT Pub. No.: WO2008/078094
PCT Pub. Date: Jul. 3, 2008

(65) Prior Publication Data
US 2010/0100608 A1    Apr. 22, 2010

(30) Foreign Application Priority Data

Dec. 22, 2006   (GB) .................................. 0625811.5

(51) Int. Cl.
| | |
|---|---|
| H04N 7/173 | (2011.01) |
| H04N 21/658 | (2011.01) |
| H04N 21/482 | (2011.01) |
| H04N 21/432 | (2011.01) |
| H04N 21/472 | (2011.01) |

(52) U.S. Cl.
CPC ..... *H04N 7/17318* (2013.01); *H04N 21/4325* (2013.01); *H04N 21/47202* (2013.01); *H04N 21/4821* (2013.01); *H04N 21/6581* (2013.01)

(58) Field of Classification Search
CPC .......... H04N 7/17318; H04N 21/4325; H04N 21/4821
USPC .................................... 709/219, 227
See application file for complete search history.

(56) References Cited

U.S. PATENT DOCUMENTS

| | | | | |
|---|---|---|---|---|
| 7,099,946 | B2* | 8/2006 | Lennon et al. ............... | 709/227 |
| 7,213,075 | B2* | 5/2007 | Feig .............................. | 709/231 |
| 7,483,958 | B1* | 1/2009 | Elabbady et al. ........... | 709/217 |
| 7,680,824 | B2* | 3/2010 | Plastina et al. .............. | 715/764 |
| 7,739,723 | B2* | 6/2010 | Rogers et al. .................... | 726/2 |
| 7,761,800 | B2* | 7/2010 | Chaudhri ............... | B60K 35/00 |
| | | | | 715/764 |

(Continued)

FOREIGN PATENT DOCUMENTS

| | | |
|---|---|---|
| EP | 1282049 A2 | 2/2003 |
| EP | 1326173 A1 | 7/2003 |

(Continued)

*Primary Examiner* — Minh Chau Nguyen
(74) *Attorney, Agent, or Firm* — Katten Muchin Rosenman LLP

(57) ABSTRACT

A media device is provided for receiving a listing of media content items from a server, at least one of the media content items being a group entity which is representative of a collection of individual media content items. Each of the media content items is then presented to the user for selection. A user may select one of the group entities and the associated individual media content items will then be presented to the user for further selection. An individual media content item may be selected and the selected media content may be transmitted from the server to the media receiver for immediate play back or saved for later playback.

22 Claims, 4 Drawing Sheets

(56) References Cited

U.S. PATENT DOCUMENTS

| | | | |
|---|---|---|---|
| 7,788,582 B2 * | 8/2010 | Robbin et al. | 715/716 |
| 7,853,893 B2 * | 12/2010 | Muller | G06F 9/4443 715/762 |
| 2004/0125124 A1 * | 7/2004 | Kim | G06F 17/30799 715/716 |
| 2004/0136244 A1 * | 7/2004 | Nakamura | G06F 17/30775 365/200 |
| 2004/0267812 A1 * | 12/2004 | Harris | G10H 1/0058 707/999.01 |
| 2005/0108319 A1 * | 5/2005 | Kohno | G06F 17/30017 709/201 |
| 2005/0149977 A1 * | 7/2005 | Nakamura et al. | 725/105 |
| 2005/0177624 A1 * | 8/2005 | Oswald et al. | 709/219 |
| 2005/0188408 A1 | 8/2005 | Wallis et al. | |
| 2005/0193094 A1 * | 9/2005 | Robbin et al. | 709/219 |
| 2005/0210145 A1 * | 9/2005 | Kim et al. | 709/231 |
| 2005/0228806 A1 * | 10/2005 | Haberman | 707/100 |
| 2005/0249551 A1 * | 11/2005 | Mertens | E01F 15/085 404/6 |
| 2005/0283791 A1 * | 12/2005 | McCarthy et al. | 725/1 |
| 2006/0008256 A1 * | 1/2006 | Khedouri | G06F 17/30038 386/234 |
| 2006/0010394 A1 * | 1/2006 | Chaudhri | B60K 35/00 715/779 |
| 2006/0015904 A1 * | 1/2006 | Marcus | 725/46 |
| 2006/0029093 A1 * | 2/2006 | Van Rossum | 370/432 |
| 2006/0053079 A1 * | 3/2006 | Edmonson | G06F 21/10 705/59 |
| 2006/0098947 A1 * | 5/2006 | Kim | G11B 27/105 386/230 |
| 2006/0133414 A1 * | 6/2006 | Luoma | H04W 88/16 370/466 |
| 2006/0143664 A1 | 6/2006 | Hartselle et al. | |
| 2006/0156219 A1 * | 7/2006 | Haot et al. | 715/500.1 |
| 2006/0195513 A1 * | 8/2006 | Rogers et al. | 709/203 |
| 2006/0195789 A1 * | 8/2006 | Rogers et al. | 715/727 |
| 2006/0256078 A1 * | 11/2006 | Flinchem et al. | 345/156 |
| 2007/0028269 A1 * | 2/2007 | Nezu et al. | 725/52 |
| 2007/0147351 A1 * | 6/2007 | Dietrich et al. | 370/352 |
| 2007/0166687 A1 * | 7/2007 | Bell | G06Q 30/06 434/350 |
| 2007/0209005 A1 * | 9/2007 | Shaver et al. | 715/733 |
| 2007/0260573 A1 * | 11/2007 | Morrill et al. | 707/1 |
| 2008/0065722 A1 * | 3/2008 | Brodersen et al. | 709/203 |
| 2008/0066016 A1 * | 3/2008 | Dowdy | G06F 17/30775 715/854 |
| 2008/0140523 A1 * | 6/2008 | Mahoney et al. | 705/14 |
| 2009/0033806 A1 * | 2/2009 | Yuasa | 348/734 |

FOREIGN PATENT DOCUMENTS

| | | |
|---|---|---|
| GB | 2407738 A | 5/2005 |
| GB | 2411534 A | 8/2005 |
| WO | WO 99/60790 A1 | 11/1999 |
| WO | WO 01/78383 A2 | 10/2001 |
| WO | WO 02/102079 A1 | 12/2002 |
| WO | WO 2004/047432 | 6/2004 |

* cited by examiner

MEDIA DEVICE AND INTERFACE

FIELD OF THE INVENTION

The present invention relates to an apparatus, method and system for receiving and playback of media content, particularly in a video on demand (VOD) media system.

BACKGROUND OF THE INVENTION

In a conventional Video on Demand (VOD) system, a library of media content is stored at a media server. Users select media content from the library and the selected media content is streamed or downloaded to the user's media receiver. The bandwidth requirements of this type of VOD system are very high, because a point-to-point connection is established to each user, and the instantaneous bandwidth demands of all users must be met. Consumers can also find too many different items of media content on offer daunting and less attractive than a managed choice of the media content.

In conventional media playback systems, such as a personal computer running Windows Media Player or Windows Media Center, a graphical user interface (GUI) can be generated to display a list of all media stored on the computer. The GUI may be configured to display the list of media as categories of media, such as media type or genre, based on metadata associated with the media. Typically, the categorisation is carried out automatically by the system. However, the displayed lists may still be unwieldy because the user may still find too many different items of media within each category.

STATEMENT OF THE INVENTION

In one aspect of the invention, a media system is provided for receiving a listing of media content entities from a server, at least one of the media content entities being a group entity which is representative of a collection of individual media content entities. Each of the content media entities is then presented to the user for selection. A user may select one of the group entities and the associated individual media content entities will then be presented to the user for further selection. An individual media content entity may then media receiver for immediate playback or saved for later playback.

There may be a delay between selection of a group entity and the display of the associated individual media content entities in an embodiment where a listing of the associated individual media entities must be retrieved from the server after a group entity is selected by the user.

In another aspect of the invention, there is provided a method of operating a media system, as described above. In another aspect, there is provided a computer program arranged to carry out the method when executed on the media system.

In another aspect of the invention, there is provided a media server which transmits information specifying a listing of group and individual media entities and transmits a requested programme in response to a selected individual media content entity.

BRIEF DESCRIPTION OF THE DRAWINGS

Specific embodiments of the present invention will now be described with reference to the accompanying drawings, in which:

FIG. 3b is a schematic illustration of a display screen based on the graphical user interface template shown in FIG. 3a.

DETAILED DESCRIPTION OF EMBODIMENTS OF THE INVENTION

Figure 1:
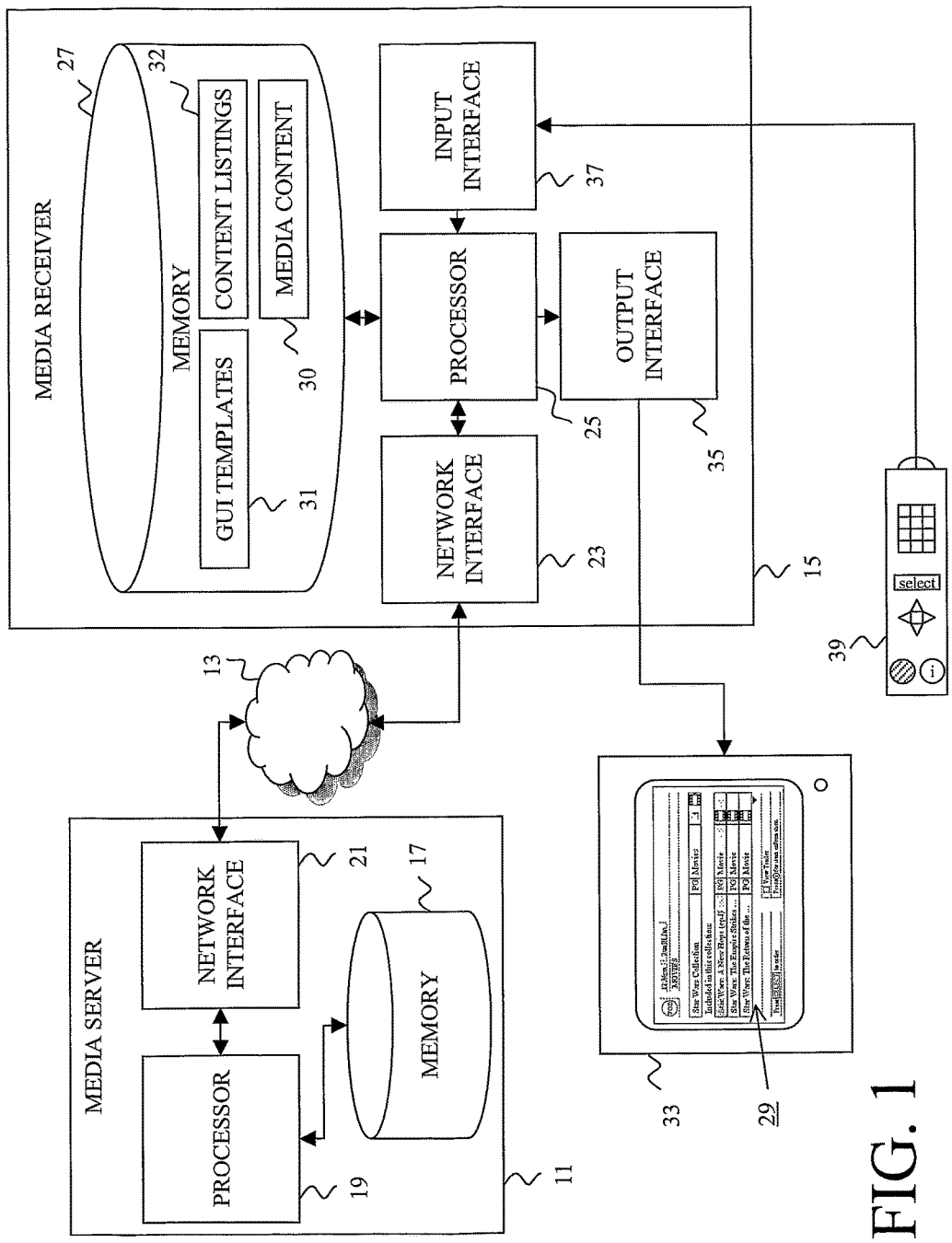
FIG. 1 is a diagram of a media system in an embodiment of the invention.

FIG. 1 is a block diagram showing functional features of the media system in an embodiment of the invention. A media server 11 provides media content over a network 13, such as the Internet, to a plurality of media receivers 15, only one of which is shown in FIG. 1. The media server 11 includes a memory 17 such as a hard disk which stores media content items, such as audio and/or video programmes. The media server 11 also includes a processor 19 which outputs the stored media content items to a media receiver 15 via a network interface 21, such as a network interface card (NIC). The processor 19 can also generate a list of some or all of the content stored in the content memory 17 and the generated content listing can be transmitted to the media receiver 15. The generated content list may be stored in the memory 17 and updated as new content is added to the media server.

The media receiver 15 receives the content items and content listings transmitted by the media server 17 via a respective network interface 23, such as a NIC. The media receiver 15 includes a processor 25 which stores the received media content 30 and content listings 32 in a memory 27 such as a hard disk. The processor 25 can subsequently playback the received media content 30 in response to a user request.

The processor 25 of the media receiver 15 can also generate a graphical user interface (GUI) display screen 29 using GUI templates 31 which are stored in the memory 27. As will be described in more detail below, the processor 25 generates a GUI display screen 29 using a particular GUI template 31 together with information stored in the memory 27, such as the content listings 32 received from the media server 11. The content listings 32 may also include listings of the media content 30 stored in the memory 27 of the media receiver 15, which may be generated by the processor 25. The contact listings 32 may be stored in any form, such as an XML data file. The processor 25 can output a generated GUI to an audio visual display 33 via a suitable output interface 35. The media receiver 15 also includes a suitable input interface 37 for receiving input commands by a user via a remote controller 39.

Figure 2:
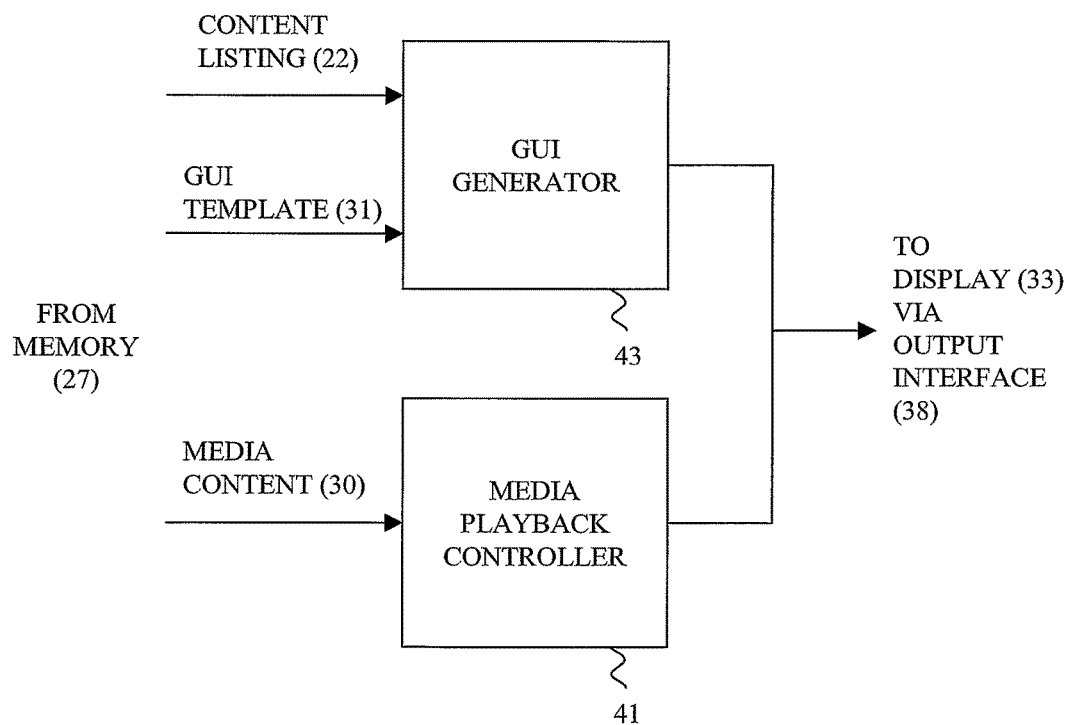
FIG. 2 is a diagram of the functional components of the processor of the media receiver shown in FIG. 1.

FIG. 2 is a block diagram showing the functional components of the processor 25 of the media receiver 15 shown in FIG. 1. The processor 25 includes a media playback controller 41 which controls the playback of received media content items which are stored in the memory 27. The processor 25 also includes a GUI generator 43 which receives a GUI template 31 and a content listing 32 from the memory 27 and generates a GUI for display on the audio-visual display 33, as will be described below.

Generation of GUI

A media receiver 15 typically has a number of different screens which can be displayed to the user on the audio-visual display 33. For example, one particular screen will be shown when the media receiver is first switched on, a different screen will be shown when the user wishes to view a listing of all content items available on the media server 11 or stored on the media receiver itself, and yet another screen will be shown when the user has selected an individual media content item to download and/or watch. Each of the GUI screens which can be displayed on the audio-visual display 33 is generated from a corresponding GUI template 31 stored in the memory 27 of the media receiver 15. A GUI template 31 defines the layout of various information such as content listings or content information, to be displayed to the user but does not include the actual information. The GUI generator 43 retrieves a stored GUI template 31 for a particular display screen 29 and retrieves the necessary information to populate the various fields of the GUI template 31.

Figure 3A:
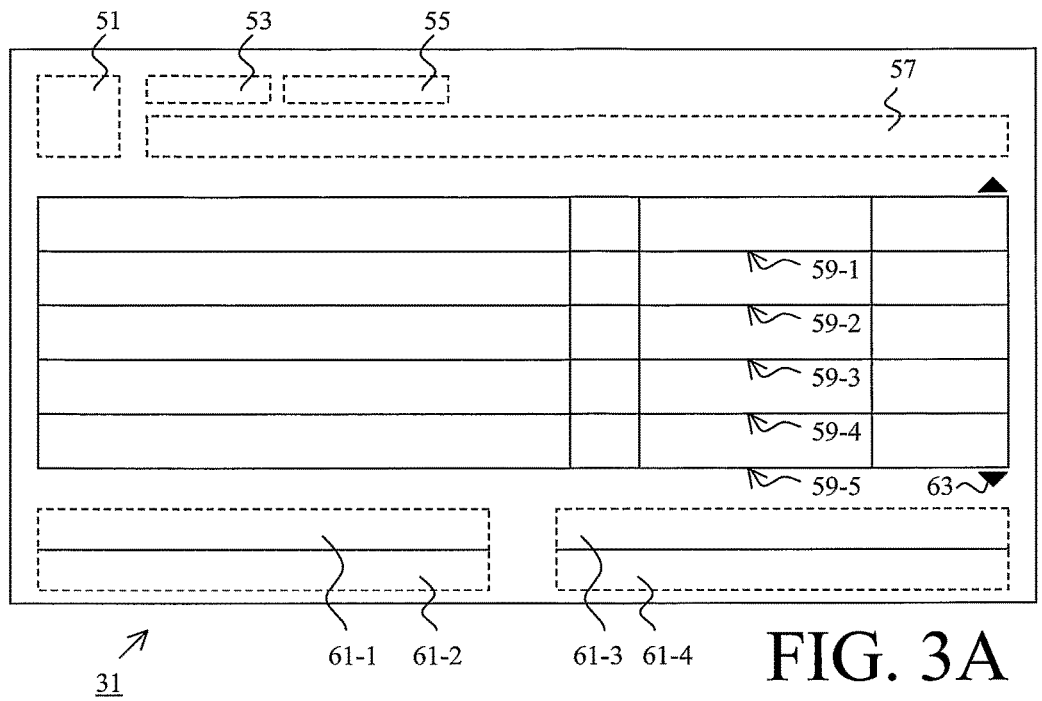
FIG. 3a is a schematic illustration of an example of a graphical user interface template.

For example, if the user requests a display of all downloaded media content, then the required GUI display screen 29 is a screen displaying all media content items stored on the media receiver 15. The GUI generator 43 retrieves the stored GUI template 31 for a content listing display as well a content listing 32 of all media content items 30 stored in the memory 27 of the media receiver 15. FIG. 3A schematically illustrates an example of a GUI template 31 for displaying a listing of media content items 30. In the example shown in FIG. 3, the GUI template 31 includes empty fields defining the location in the display screen 29 of a logo 51, the current time 53, the current date 55, a screen title 57, the listing of media content items 59-1 to 59-5, and control options 61-1 to 61-4 which may be available to the user for example by pressing a specified button on the remote controller 39. In the example shown in FIG. 3A the number of fields provided has been chosen for simplicity of the figure. For example, only five rows of media content items are shown and the skilled reader will appreciate that any predetermined number of content items to be displayed on a particular display screen 29 may be defined by a GUI template 31. Similarly, although four fields are provided for displaying control options, the skilled reader will appreciate that not all of the four fields may be used in a particular display screen 29 and alternatively more than four fields may be defined.

Figure 3B:
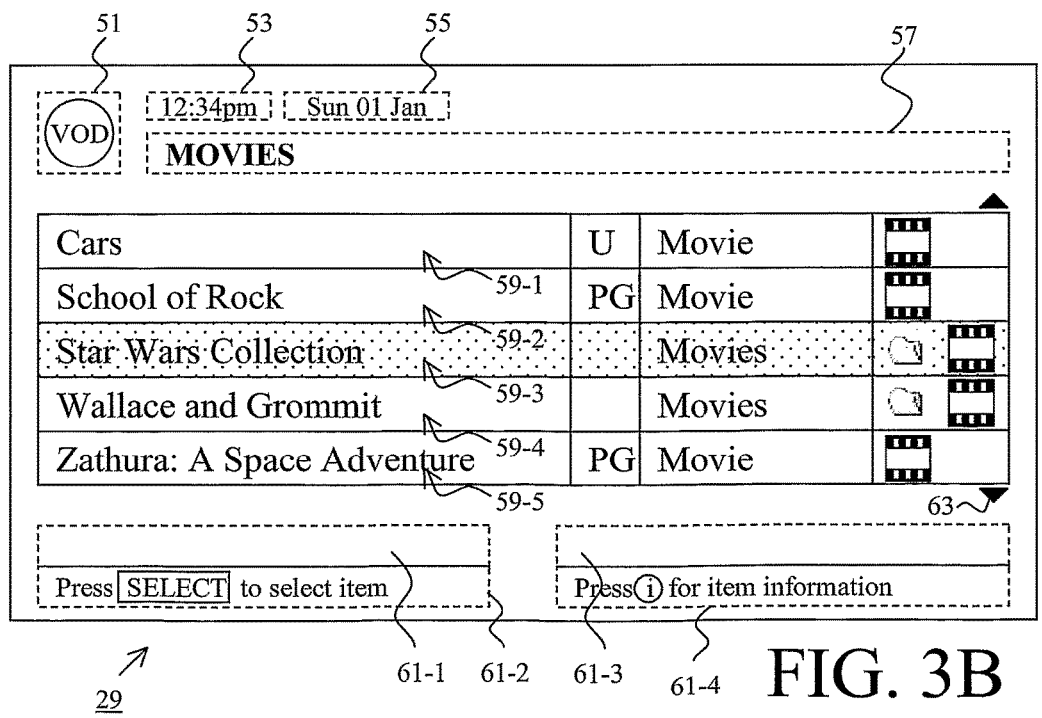

FIG. 3B shows a resulting display screen 29 which has been generated by the GUI generator 43. The fields of the GUI template 31 have been populated with the respective information. In particular, the media content fields 59-1 to 59-5 are populated using the content listing 32 information retrieved from the memory 27. Arrows 63 may be provided to indicate that there are more media content items stored on the media receiver 15 in addition to the five which are displayed on the present display screen. In the example display screen shown in FIG. 3B, the item on row 59-3 is currently highlighted (as indicated by the shaded row) and the user is presented with two options 61-2 and 61-4, to either select the highlighted media content item by pressing a "select" button on the remote controller 39 or to obtain information about the highlighted item by pressing an information button on the remote controller 39.

In another example, if the user requests a display of all media content available from the media server 11, then the GUI generator 43 would populate the media content fields 59-1 to 59-5 with information from the stored media content listing 32 received from the media server 11. In such a case, those skilled in the art will appreciate that there may be a significant number of media content items available on the media server 11 and a content listing 32 of every single individual media content item would be of a significant data size. The present invention therefore provides a way of reducing the amount of information that is required to be transmitted by the media server 11 at any one time, and consequently reduces the number of media content items which are displayed to the user allowing for a more managed choice from all of the displayed media content items.

In the exemplary display screen 29 shown in FIG. 3B, the media content entities labelled "Star Wars Collection" 59-3 and "Wallace and Grommit" 59-4 are representative of a collection or group of individual media content items. The two group entities also include an icon indicating that the content item is representative of a collection or group of individual media content items. When a user is provided with this display screen 29, the user may select a particular media content item by, for example, using appropriate arrow buttons on the remote controller 39 to scroll through the displayed rows of fields 59-1 to 59-5 as indicated by the highlighted row.

When the user wishes to view the individual media content items associated with a collection or group, the user highlights the appropriate collection item and presses, in this embodiment, the select button on the remote controller 39. As those skilled in the art will appreciate, the choice of buttons that is used will depend on the type of remote controller 39 that the user has. The control option displayed to the user is field 61-2 will indicate to the user which button to press to select the item In response to the user input, the media receiver 15 will request a further content listing 32 from the media server 11 listing the individual media content items included in the selected collection item. In this embodiment the grouping of items into a collection is the result of an editorial process performed by a VOD media content operator. The results of the grouping may be stored in the memory 17 of the media server 11 for retrieval by the processor 19 when the further content listing is to be generated. The GUI controller 43 then generates an appropriate group media content display screen 29 using an appropriate template together with the further control listing 32 received from the media server, for subsequent display to the user.

Figure 4A:
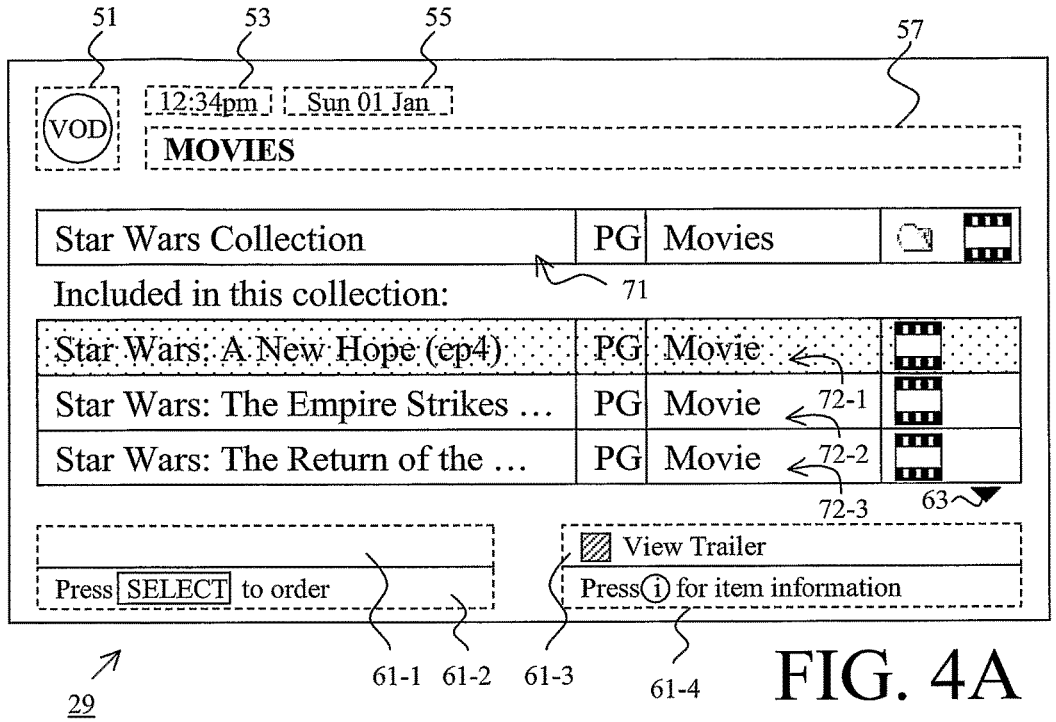
FIG. 4 is a schematic illustration of another display screen based on a different graphical user interface template.
Figure 4B:
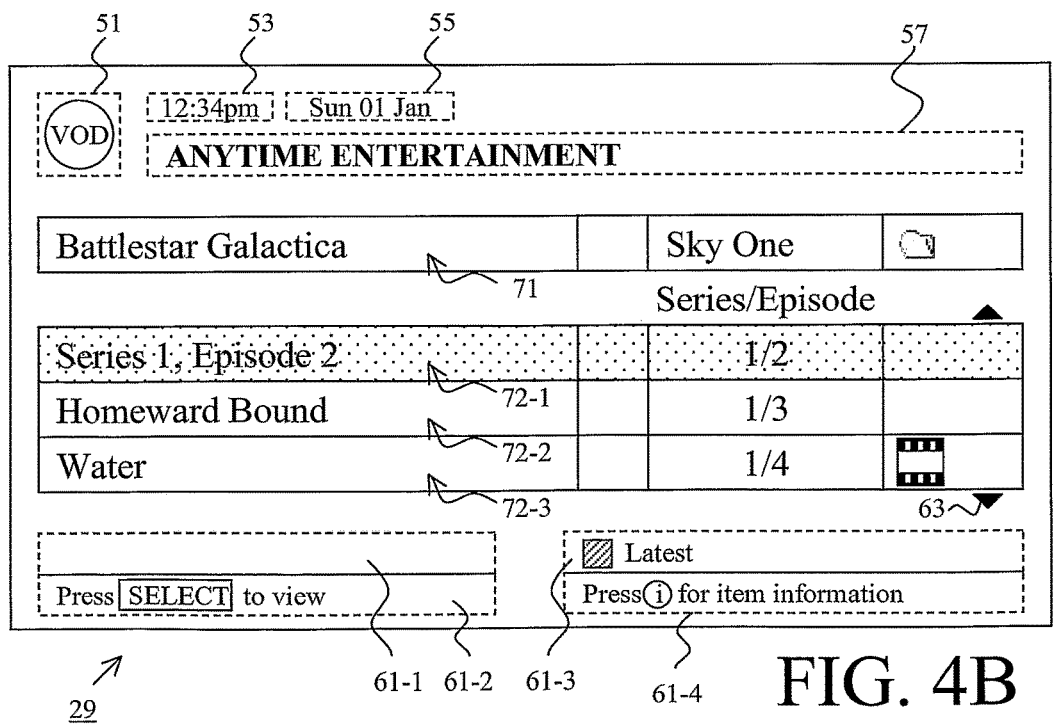

FIG. 4A shows an example of a display screen which is generated by the GUI generator 43 in response to a user selecting the "Star Wars Collection" item 59-3 shown in FIG. 3B. As shown in FIG. 4A, the generated display screen 29 includes similar fields to the content listing display screen shown in FIG. 3B. The main difference is that instead of a listing of five media content items, one field is provided for the collection item name 71 and a number of additional fields (in this example, three are shown) for the individual content items 73-1 to 73-3 which are included in the selected collection.

In the examples given above, the individual and collections of media content items are movies which are available for streaming playback or download from the media server 11, or which are stored on the media receiver 15. In addition or alternatively, the collection of individual content items may be episodes of a television programme series. Typically, such a TV series may include, for example, twenty four separate episodes and consequently, the present invention provides that an initial media content listing 32 which is generated and transmitted by the media server 11 will collapse the list of twenty four individual content items to a single group entity. In this way, the amount of information that is transmitted to the media receiver 15 is reduced and the subsequently displayed list of media content is also significantly shortened, aiding the user in making a managed choice.

In the above description, the media server 11 and the media receiver 15 are arranged to store and execute software which controls their respective operation to perform the method described above. As those skilled in the art will appreciate, a computer program for configuring a programmable device to become operable to perform the above method may be stored on a carrier and loaded into memory, such as a flash memory of the media server 11 and/or media receiver 15. The program may be downloaded as a satellite broadcast signal and applied as a patch or update to software already resident on the media server 11 and/or media receiver 15. The scope of the present invention includes the program, the carrier carrying the program and the broadcast signal.

Alternative Embodiments

The embodiments are described above purely by way of example, and variations may occur to the skilled person on reading the description, which nevertheless fall within the scope of the invention as defined by the claims. For example, the following modifications are possible.

In the embodiments described above, the media receiver 15 included a memory 27 such as a hard disk for storing media content received from the media server 17. The processor was arranged to subsequently playback the received media content in accordance with a user request. As those skilled in the art will appreciate, as an alternative, the media content transmitted by the media service 17 may be received by the media receiver 15 for immediate playback by the media receiver. In such an alternative embodiment, the memory 27 of the media receiver 15 may include a RAM for storing a buffered portion of the received media content to enable streaming playback of the media content on the audio visual display 33.

In the embodiments described above, the content listings 32 are generated and stored in memory for subsequent retrieval and use, for example in the generation of a GUI display screen. As those skilled in the art will appreciate, the content listings need not be pre-generated and pre-stored but may instead be generated on the fly. Additionally, in the embodiment described above, the grouping of items into a collection is performed by a VOD media content operator. As those skilled in the art will appreciate, this processing may be performed by the media server. For example, the media server could be configured to automatically create collections of individual media content items based on content having similar attributes such as genre or actors/actresses.

In the embodiments described above, the media server 11 can provide media content to the media receiver as streaming media content for immediate playback by the media receiver on the audio-visual display. As those skilled in the art will appreciate, the processor 19 of the media server 11 may additionally be configured to perform encoding and/or compression of the media content before transmission to the media receiver. The processor 25 of the media receiver 15 will also be configured so as to decode and/or decompress the received media content. In such an alternative, it will be understood that playback of the content media will be substantially in real-time.

The invention claimed is:

1. A media server comprising:
a memory storing individual media content items for transmission in response to requests for the media content, wherein at least some of the individual media content items are associated with a group entity, and
one or more processors configured to:
generate first content listing data identifying a first listing of stored media content entities;
process the generated first content listing data to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;
transmit the first content listing data to a media receiver;
receive, from a media receiver, selection data identifying the selected group entity from the first listing;
in response to receiving the selection data, generate second content listing data identifying a further listing including the individual media content items that are associated with the selected group entity; and
transmit the second content listing data to the media receiver as a response to the received selection data.

2. A media server according to claim 1, wherein the receiver is further operable to receive selection data identifying a selected individual media content item from the first listing, and wherein the media server is further configured to determine, from the received selection data, whether the user selected entity is a group entity or an individual entity, and responsive to determination that the user selected entity is an individual media content item, initiate playback or download of the individual media content item to the media receiver.

3. A method of providing a display of media content items available on a media server storing individual media content items for transmission in response to requests from the media receiver for the individual media content items, wherein at least some of the individual media content items are associated with a group entity, comprising, at the media receiver:
receiving and storing, in a memory, first content listing data identifying a first listing of media content entities generated by the media server, the first content listing data having been processed to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;
generating a user interface display screen including the first listing of media content entities of the received first content listing data;
outputting the generated user interface display screen to the user, wherein the group entity and the at least one other individual media content item that is not associated with any group entity of the first listing are displayed in the user interface display screen as part of the first listing;

receiving a user selection of a group entity from the output first listing;

transmitting, to the media server, selection data identifying the selected group entity from the first listing;

receiving and storing, in a memory, second content listing data identifying a further listing including the individual media content items that are associated with the selected group entity, generated by the media server in response to receiving the selection data;

updating the user interface display screen with the second content listing data;

receiving a user selection of the individual media content item from the further listing;

transmitting a request for the selected individual media content item;

receiving the requested individual media content item from the media server; and playing back the received individual media content item.

4. A method according to claim 3, wherein the user interface is generated by populating a GUI template with information from the received content listing.

5. A method according to claim 3, wherein streaming playback of the received individual media content item is performed.

6. A method according to claim 3, wherein the media receiver further comprises a data store operable to store the received individual media content item and wherein the playback unit is operable to retrieve the stored individual media content item for playback.

7. A method according to claim 3, wherein the user input is received from a remote controller.

8. A method according to claim 3, wherein the step of generating a user interface further comprises a step of including an icon in the generated user interface indicating that a media content entity is a group entity.

9. A computer program product embodied on a non-transitory computer-readable storage medium containing computer implementable instructions executable by a media receiver computer to perform a method comprising:

receiving and storing, in a memory, first content listing data identifying a first listing of media content entities generated by a media server storing individual media content items for transmission in response to requests from the media receiver for the individual media content items, wherein at least some of the individual media content items are associated with a group entity, the first content listing data having been processed to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;

generating a user interface display screen including the first listing of media content entities of the received first content listing data;

outputting the generated user interface display screen to the user, wherein the group entity and the at least one other individual media content item that is not associated with any group entity of the first listing are displayed in the user interface display screen as part of the first listing;

receiving a user selection of a group entity from the output first listing;

transmitting selection data identifying the selected group entity from the first listing;

receiving and storing, in a memory, second content listing data identifying a further listing including the individual media content items that are associated with the selected group entity, generated by the media server in response to receiving the selection data;

updating the user interface display screen with the second content listing data;

receiving a user selection of the individual media content item from the further listing;

transmitting a request for the selected individual media content item;

receiving the requested individual media content item from the media server; and playing back the received individual media content item.

10. A computer program product according to claim 9, wherein the user interface is generated by populating a GUI template with information from the received content listing.

11. A computer program product according to claim 9, wherein streaming playback of the received individual media content item is performed.

12. A computer program product according to claim 9, wherein the media receiver further comprises a data store operable to store the received individual media content item and wherein the playback unit is operable to retrieve the stored individual media content item for playback.

13. A computer program product according to claim 9, wherein the user input is received from a remote controller.

14. A computer program product according to claim 9, wherein the step of generating a user interface further comprises a step of including an icon in the generated user interface indicating that a media content entity is a group entity.

15. A media receiver configured to operate with a media server storing individual media content items for transmission in response to requests from the media receiver for the individual media content items, wherein at least some of the individual media content items are associated with a group entity, the media receiver comprising one or more computer processors configured to:

receive and store, in a memory, first content listing data identifying a first listing of media content entities generated by the media server, the first content listing data having been processed to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;

generate a user interface display screen including the first listing of media content entities in the received first content listing data;

output the generated user interface display screen to the user, wherein the group entity and the at least one other individual media content item that is not associated with any group entity of the first listing are displayed in the user interface display screen as part of the first listing;

receive a user selection of a group entity from the output first listing;

transmit selection data identifying the selected group entity from the first listing;

receive and store, in a memory, second content listing data identifying a further listing including the individual media content items that are associated with the selected group entity, generated by the media server in response to receiving the selection data;

update the user interface display screen with the second content listing data;

receive a user selection of an individual media content item from the further listing;

transmit a request for the selected individual media content item;

receive the requested individual media content item from the media server; and a playback unit operable to play back the received individual media content item.

16. A media receiver according to claim 15, wherein the one or more processors is further configured to generate a user interface by populating a GUI template with information from the received content listing.

17. A media receiver according to claim 15, wherein the one or more processors is further configured to receive individual media content items from the media server and to perform streaming playback of the received individual media content items.

18. A media receiver according to claim 15, further comprising a data store operable to store the received individual media content item and wherein the one or more processors is further configured to retrieve the stored individual media content item for playback.

19. A media receiver according to claim 15, further comprising a command receiver operable to receive input commands from a remote controller.

20. A media receiver according to claim 15, wherein the one or more processors is further configured to include an icon in the generated user interface indicating that a media content entity is a group entity.

21. A method of providing data listing content items available on a media server, comprising one or more processors implemented steps of, at the media server:

storing a plurality of individual media content items for transmission in response to requests for media content, wherein at least some of the individual media content items are associated with a group entity;

generating first content listing data identifying a first listing of stored media content entities;

processing the generated first content listing data to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;

transmitting the first content listing data to a media receiver;

receiving, from a media receiver, selection data identifying the selected group entity from the first listing;

in response to receiving the selection data, generating second content listing data identifying a further listing including the individual media content items that are associated with the selected group entity; and transmitting the second content listing data to the media receiver as a response to the received selection data.

22. A computer program product embodied on a non-transitory computer-readable storage medium containing computer implementable instructions executable by a media server computer to perform a method comprising:

storing a plurality of individual media content items for transmission in response to requests for media content, wherein at least some of the individual media content items are associated with a group entity;

generating first content listing data identifying a first listing of stored media content entities;

processing the generated first content listing data to collapse the individual media content items that are associated with a group entity to a single group entity in the first listing, the resulting first listing including media content entities comprising the group entity and at least one other individual media content item that is not associated with any group entity of the first listing, wherein the individual media content items that are associated with the group entity are not included in the first listing;

transmitting the first content listing data to a media receiver;

receiving, from a media receiver, selection data identifying the selected group entity from the first listing;

in response to receiving the selection data, generating second content listing data identifying a further listing including the individual media content items that are associated with the selected group entity; and transmitting the second content listing data to the media receiver as a response to the received selection data.

* * * * *